(12) United States Patent
Bartrom

(10) Patent No.: US 7,398,947 B2
(45) Date of Patent: Jul. 15, 2008

(54) CAR RADIO MOUNTING DEVICE

(76) Inventor: Michael A Bartrom, 2151 E. 375 North, Marion, IN (US) 46952

(*) Notice: Subject to any disclaimer, the term of this patent is extended or adjusted under 35 U.S.C. 154(b) by 136 days.

(21) Appl. No.: 11/138,094

(22) Filed: May 26, 2005

(65) Prior Publication Data

US 2006/0266890 A1    Nov. 30, 2006

(51) Int. Cl.
*G12B 9/00* (2006.01)
(52) U.S. Cl. ............................ 248/27.1; 455/345
(58) Field of Classification Search ............. 248/27.1, 248/27.3, 544, 551, 201, 231.9; 312/7.1; 455/345; 220/3.6; 361/814
See application file for complete search history.

(56) References Cited

U.S. PATENT DOCUMENTS

| | | | |
|---|---|---|---|
| 3,268,190 A * | 8/1966 | Hansen | 248/27.1 |
| 3,685,579 A | 8/1972 | Tsuji | |
| 4,194,585 A | 3/1980 | Prince | |
| 4,462,564 A * | 7/1984 | Alves et al. | 248/27.1 |
| 4,557,445 A | 12/1985 | Ohara | |
| 4,630,160 A * | 12/1986 | Murayama | 360/137 |
| 4,736,924 A * | 4/1988 | Bednar | 248/558 |
| 4,738,420 A * | 4/1988 | Angle et al. | 248/27.1 |
| 4,742,978 A * | 5/1988 | Ponticelli | 248/27.1 |
| 4,784,357 A * | 11/1988 | Kimura | 248/27.1 |
| 4,867,398 A | 9/1989 | Butcher et al. | |
| 4,895,326 A * | 1/1990 | Nimpoeno et al. | 248/27.1 |
| 4,993,668 A | 2/1991 | Inamura | |
| 5,104,071 A * | 4/1992 | Kowalski | 248/27.1 |
| 5,106,039 A * | 4/1992 | Gross | 248/27.1 |
| 5,169,097 A | 12/1992 | Yasukawa | |
| 5,280,865 A * | 1/1994 | Van Hout et al. | 248/27.1 |
| 5,312,263 A | 5/1994 | Zapalski et al. | |
| 5,467,947 A * | 11/1995 | Quilling, II | 248/27.1 |
| 5,895,016 A * | 4/1999 | Blackburn | 248/27.1 |

(Continued)

FOREIGN PATENT DOCUMENTS

EP        000957003 A1    11/1999

(Continued)

*Primary Examiner*—Brian Glessner
*Assistant Examiner*—Bradley H Duckworth
(74) *Attorney, Agent, or Firm*—Taft Stettinus & Hollister LLP

(57) ABSTRACT

A mounting device that enables a contemporary audio/video accessory to be installed in the dashboard of an older model vehicle includes a flange, at least one wall, and a plurality of shoulders. The flange has a rearward-facing surface and an opposite engagement surface configured to engage the dashboard along the perimeter of the opening and to face in the frontward direction. The flange has an inner rim defining an entrance of the channel that is sized to receive the audio/video accessory. At least one wall extends from the engagement surface of the flange, and is sized to be received in the dashboard opening. The shoulders extend in an inward direction from the at least one wall. The shoulders have respective abutment surfaces facing the engagement surface of the flange. The abutment surfaces engage the outer portion of the audio/video accessory when the accessory is inserted into the channel. The abutment surfaces prevent further movement of the audio/video accessory in the frontward direction through the channel. The abutment surfaces are offset from the rearward-facing surface of the flange by a distance of at least 0.25 inch in the frontward direction.

4 Claims, 14 Drawing Sheets

U.S. PATENT DOCUMENTS

| | | |
|---|---|---|
| D442,948 S | 5/2001 | Kosinski, II |
| D444,146 S | 6/2001 | Weiland et al. |
| D517,061 S * | 3/2006 | Quilling, II ................. D14/258 |
| 2005/0116135 A1* | 6/2005 | Peng et al. ................... 248/694 |

FOREIGN PATENT DOCUMENTS

| | | |
|---|---|---|
| GB | 002162239 A | 1/1986 |

* cited by examiner

CAR RADIO MOUNTING DEVICE

TECHNICAL BACKGROUND

The present invention relates to a mounting device, method, and kit for mounting an audio/video accessory in the dashboard of a vehicle, and more particularly, to a mounting device, method, and kit for mounting a modern audio/video accessory in the dashboard of an older model vehicle.

BACKGROUND OF THE INVENTION

In order to mount a modern car audio/video accessory, such as a radio or compact disc player, into a designated opening in the dashboard of an older model vehicle, particularly a 1950's, 1960's or 1970's model vehicle, a plastic adapter that is capable of being coupled with both a standard DIN radio sleeve and the dashboard opening is typically employed. The original mounting device cannot be used to mount the new accessory because it is configured to fit a device that consists of two forward extending control shafts, which modern radios do not have. Moreover, the width of the opening in the original equipment mounting device is too small to receive modern audio/video accessories, which are wider. The plastic adapter has a channel, defined by four walls, sized to receive a modern audio/video accessory. The plastic adapter and the radio sleeve retain and stabilize the new replacement accessory in the dashboard.

In order for the adapter to fit into the dashboard of the vehicle, the existing opening in the dashboard may be cut in order to enlarge the opening to a size that accommodates the new adaptor. Once the plastic adaptor is fitted in the newly enlarged opening, it protrudes outwardly, depending on the size of the adapter, approximately one to three inches from the outer surface of the dashboard. This limitation of the prior art becomes more evident when this type of adaptor is installed in a vehicle in which the dashboard has a slanted presentation or profile, in which the top of the dashboard is closer to the passenger compartment of the vehicle and the bottom is closer to the engine compartment of the vehicle. If the dashboard has a slanted presentation, then the opening in the dashboard has a slanted presentation as well. When placed in the slanted opening, the rectangular, planar adapter faces downward, which causes the accessory to also face downward. A vertical presentation or orientation of both the adapter and the accessory is desirable so that the face of the accessory is visible and easily accessible. If the upper portion of the engagement surface of the flange engages the outer surface of the dashboard, with the flange in a vertical orientation, the lower portion of the engagement surface of the flange will be offset from the outer surface of the dashboard. Thus, in order to achieve vertical presentation of both the adapter and the accessory, a spacer device must be inserted between the lower portion of the flange's engagement surface and the outer surface of the dashboard, as is known in the art. Such spacers add to the expense and installation time of the adapter, and are visually unattractive.

The plastic adapter can be secured to the dashboard by using any of a variety of different means known in the art. After the adapter is secured, the new accessory and its sleeve are inserted into the channel of the adaptor, thus stabilizing the new accessory. Another limitation of the prior art is thereby revealed, namely, the new accessory protrudes approximately one-half inch farther outward from the outer surface of the dashboard than does the plastic adapter. There are several problems associated with the accessory protruding out beyond the dashboard. First, because the accessory protrudes outward, the accessory occupies more space in the passenger compartment. Second, the possibility of damage to the accessory and/or injury to an occupant of the vehicle is increased due to the occupant inadvertently bumping into the accessory. Third, the protruding adapter and accessory have an appearance that is not aesthetic and is not consistent with the appearance of the original equipment radio.

What is needed in the art is a mounting device that enables a modern audio/video accessory to be installed such that its face does not protrude outwardly beyond the dashboard of an older model vehicle, particularly a 1950's, 1960's or 1970's model vehicle, and that has a visible flange of approximately the same dimensions as the visible flange of the original equipment.

SUMMARY OF THE INVENTION

The present invention provides a mounting device that includes an offset that enables a modern audio/video accessory to be mounted substantially flush in the dashboard of an older model automobile.

The present invention is directed to a mounting device that allows a contemporary audio/video accessory to be installed in the dashboard of an older model vehicle. A mounting device according to one embodiment of the present invention includes a flange, at least one wall, and a plurality of shoulders. The flange has a rearward-facing surface and an opposite engagement surface configured to engage the dashboard along the perimeter of the opening and to face in the frontward direction. The flange has an inner rim defining an entrance of the channel that is sized to receive the audio/video accessory. At least one wall extends from the engagement surface of the flange, and is sized to be received in the dashboard opening. The shoulders extend in an inward direction from the at least one wall. The shoulders have respective abutment surfaces facing the engagement surface of the flange. The abutment surfaces engage the outer portion of the audio/video accessory when the accessory is inserted into the channel. The abutment surfaces prevent further movement of the audio/video accessory in the frontward direction through the channel. The abutment surfaces are offset from the rearward-facing surface of the flange by a distance of at least 0.25 inch in the frontward direction.

The present invention is directed to a mounting kit for mounting an audio/video accessory into the dashboard of a vehicle. A mounting kit according to one embodiment of the present invention includes a template and a mounting device. The template has an edge sized to define the opening to be cut in the dashboard for receiving the audio/video accessory. The mounting device has a flange, at least one wall, and a plurality of shoulders. The flange has a rearward-facing surface and an opposite engagement surface configured to engage the dashboard along the perimeter of the opening and to face in the frontward direction. The flange has an inner rim defining an entrance of the channel that is sized to receive the audio/video accessory. At least one wall extends from the engagement surface of the flange, and is sized to be received in the dashboard opening. The shoulders extend in an inward direction from the at least one wall. The shoulders have respective abutment surfaces facing the engagement surface of the flange. The abutment surfaces engage the outer portion of the audio/video accessory when the accessory is inserted into the channel. The abutment surfaces prevent further movement of the audio/video accessory in the frontward direction through the channel. The abutment surfaces are offset from the rearward-facing surface of the flange by a distance of at least 0.25 inch in the frontward direction.

The present invention is directed to a mounting method for installing an audio/video accessory into the dashboard of a vehicle. The method includes cutting an opening in the dashboard. A mounting device is provided that has a flange with a rearward-facing surface, an opposite engagement surface, and an inner rim that defines the entrance of the channel. The mounting device also has at least one wall that extends from the engagement surface of the flange, and a plurality of shoulders. The shoulders extend in an inward direction from the at least one wall and have respective abutment surfaces facing the engagement surface of the flange. The abutment surfaces are offset from the rearward-facing surface of the flange by a distance of at least 0.25 inch in the frontward direction. At least one wall of the mounting device is inserted through the opening in the dashboard until the engagement surface of the flange engages the dashboard along the perimeter of the opening. The audio/video accessory is inserted into the channel of the mounting device until the outer portion of the audio/video accessory engages the abutment surfaces of the shoulders, and further movement of the audio/video accessory in the frontward direction is prevented.

In another form, the mounting device according to the present invention is configured to be mounted in a vehicle dashboard that has a substantially vertically oriented profile.

An advantage of the mounting device of the present invention is that it enables a modern audio/video accessory to be installed in the dashboard of an older model vehicle such that the face of the accessory is substantially flush with the outer surface of the dashboard.

Another advantage is that the flange of the mounting device fits within the same designated area on the dashboard in which the original equipment flange fits. Thus, the flange of the mounting device covers all areas of the dashboard that the original equipment flange covered.

Yet another advantage is that the template of the mounting kit enables the existing opening of the dashboard to be easily enlarged in order to accommodate the mounting device.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 14 shows a perspective view of a mounting bracket of the mounting device of FIG. 13.

DESCRIPTION OF INVENTION

The embodiments hereinafter disclosed are not intended to be exhaustive or limit the invention to the precise forms disclosed in the following description. Rather the embodiments are chosen and described so that other skilled in the art may utilize its teachings.

Figure 1:
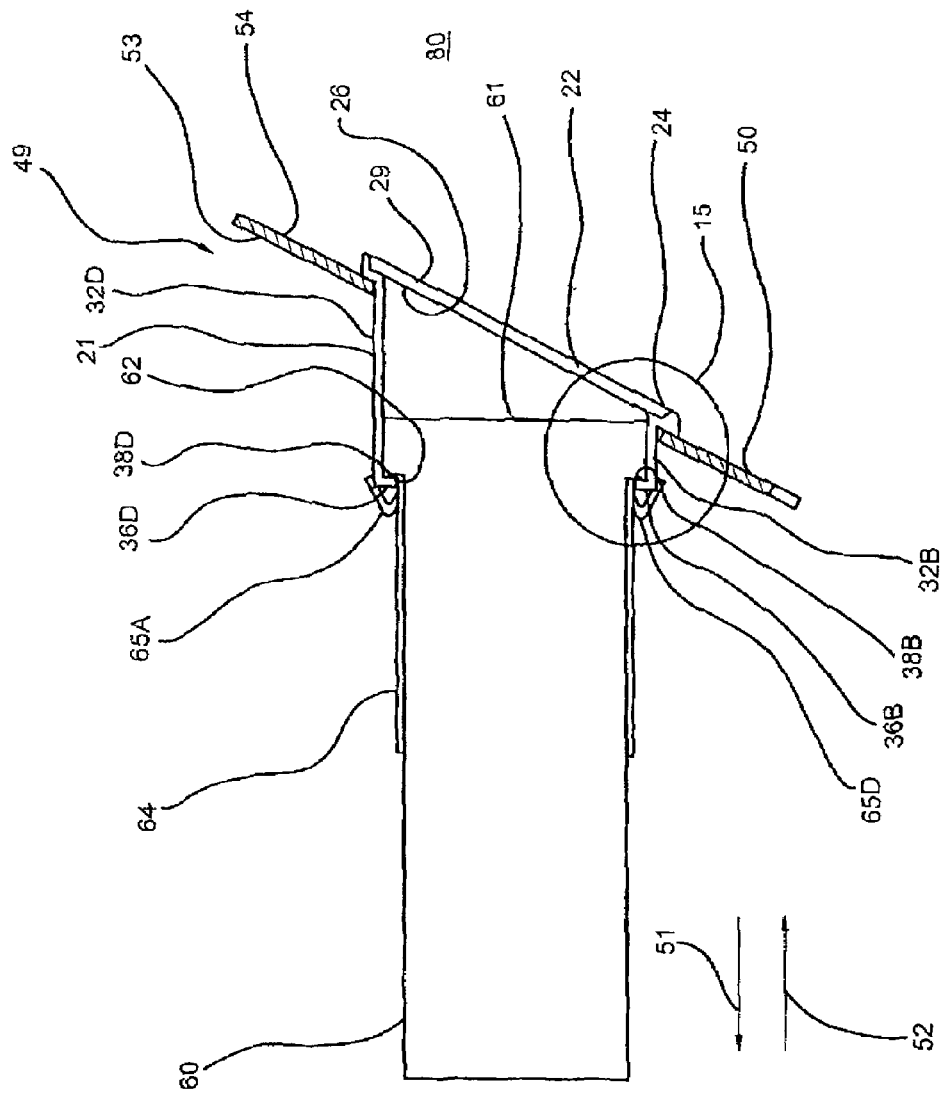
FIG. 1 shows a cross-sectional view of one embodiment of a mounting device of the present invention inserted in an opening of a vehicle dashboard. A contemporary audio/video accessory is inserted in the mounting device.
Figure 2:
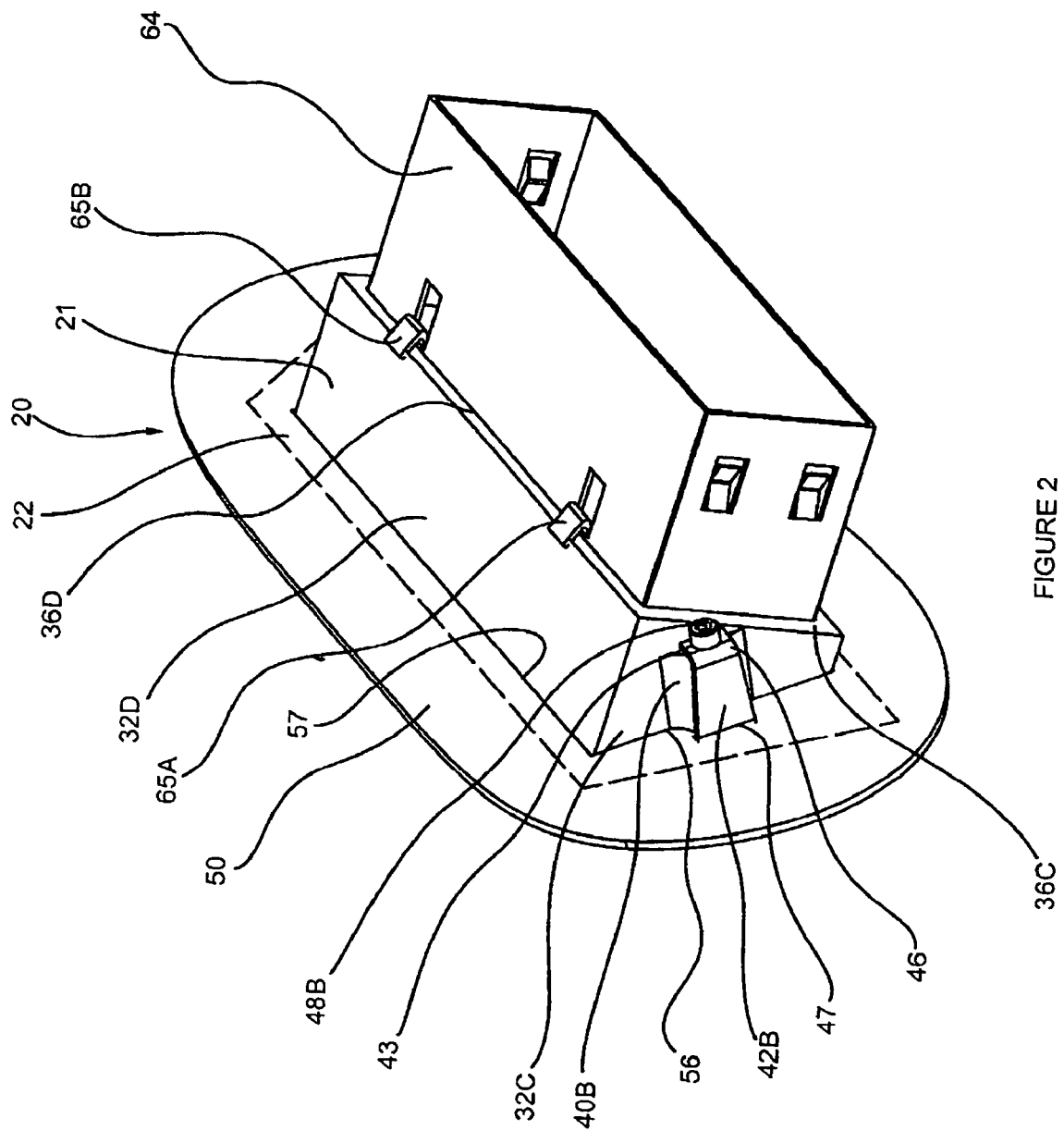
FIG. 2 shows a rearward, perspective view of the mounting device of FIG. 1 and a standard DIN radio sleeve mounted in the dashboard of a vehicle.
Figure 7:
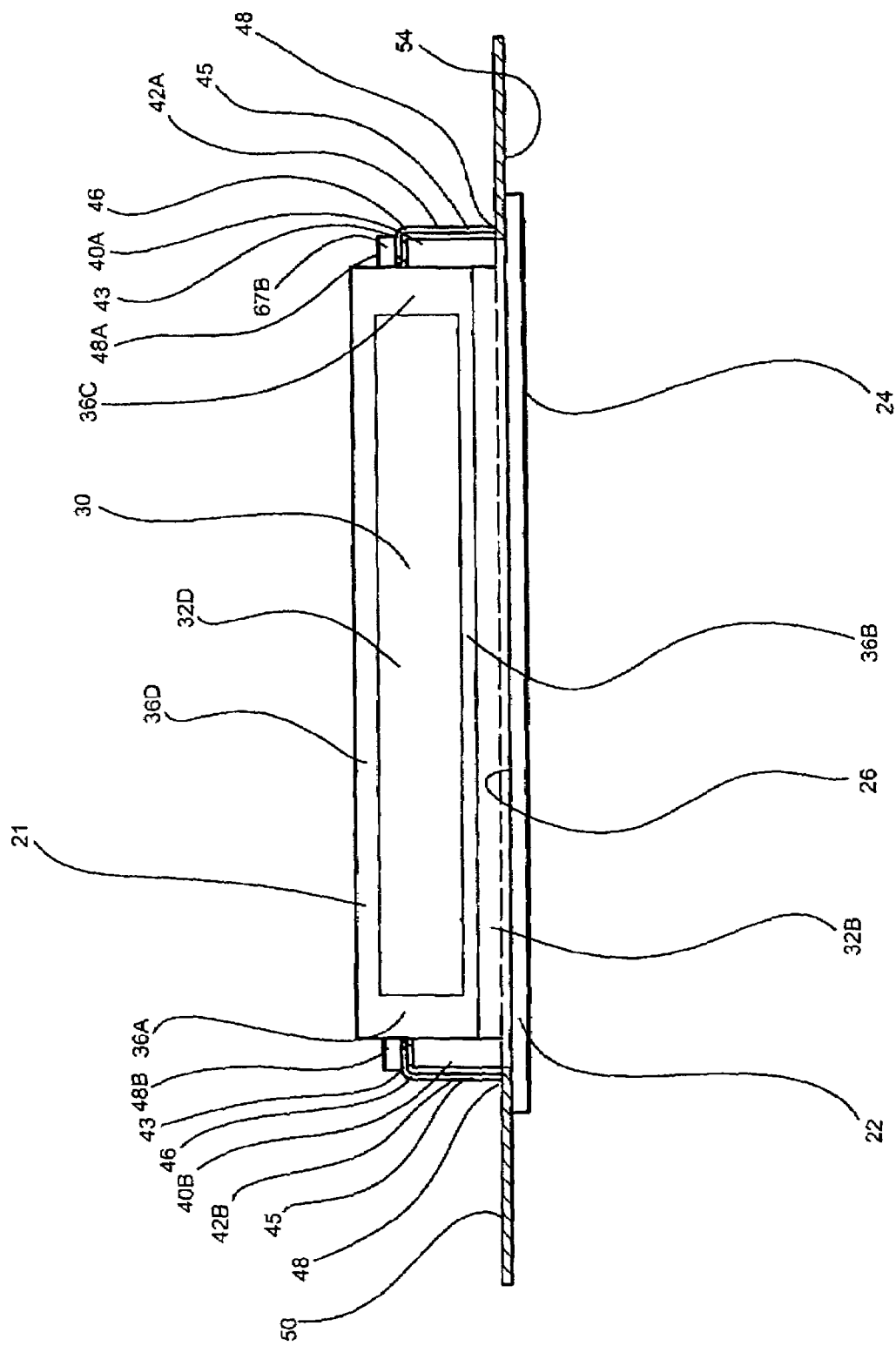
FIG. 7 shows a bottom view of the mounting device of FIG. 1 mounted in the dashboard of a vehicle.

Referring now to the drawings, and particularly to FIGS. 1 and 2, there is shown one embodiment of a mounting device 20 of the present invention for installing an audio/video accessory unit, such as a DIN radio 60, in a dashboard 50 a vehicle. A DIN radio typically includes a sleeve 64, as is well known. Mounting device 20 may be especially suitable for mounting a modern radio into the dashboard of an older automobile, such as a 1960's era Chevrolet Camaro, for example, such that a rearward-facing surface 61 of the radio is positioned substantially forward, as defined by a frontward direction 51, of dashboard 50. That is, mounting device 20 may enable a modern radio to be installed substantially forward of a profile 49 of vehicle dashboard 50. Mounting device 20 is suitable for use with a non-vertically oriented dashboard 50 that leans toward the driver. That is, the lower end of dashboard 50 may be positioned farther in frontward direction 51 than is the upper end of dashboard 50. Rearward-facing surface 61 faces a passenger compartment 80 of the vehicle, and frontward direction 51 is the general direction in which the vehicle is typically driven. Mounting device 20 includes a bezel 21, mounting brackets 42A and 42B (FIG. 7), and fasteners 48A and 48B.

Figure 3:
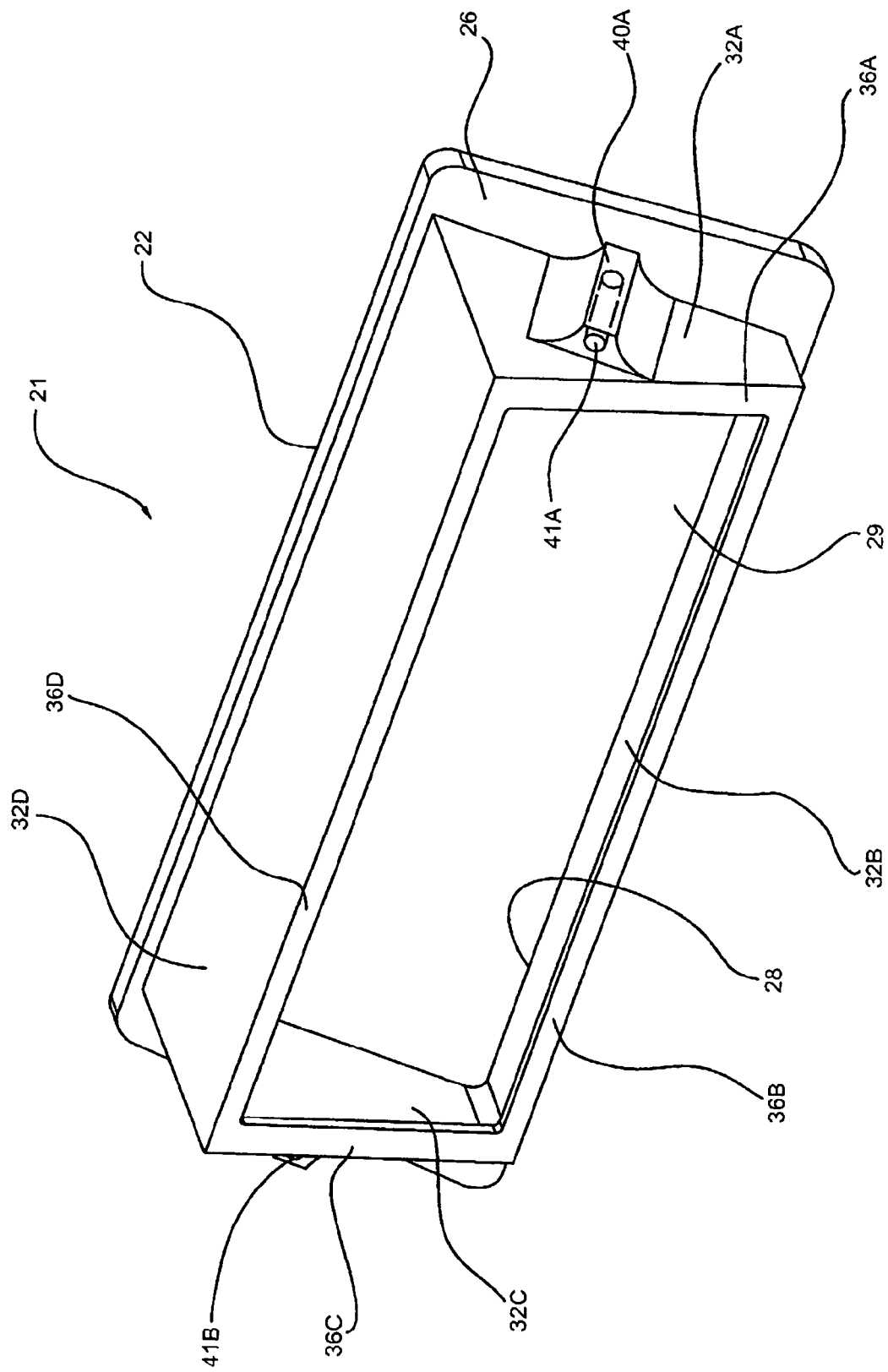
FIG. 3 shows a rearview of the bezel of the mounting device of FIG. 1.
Figure 4:
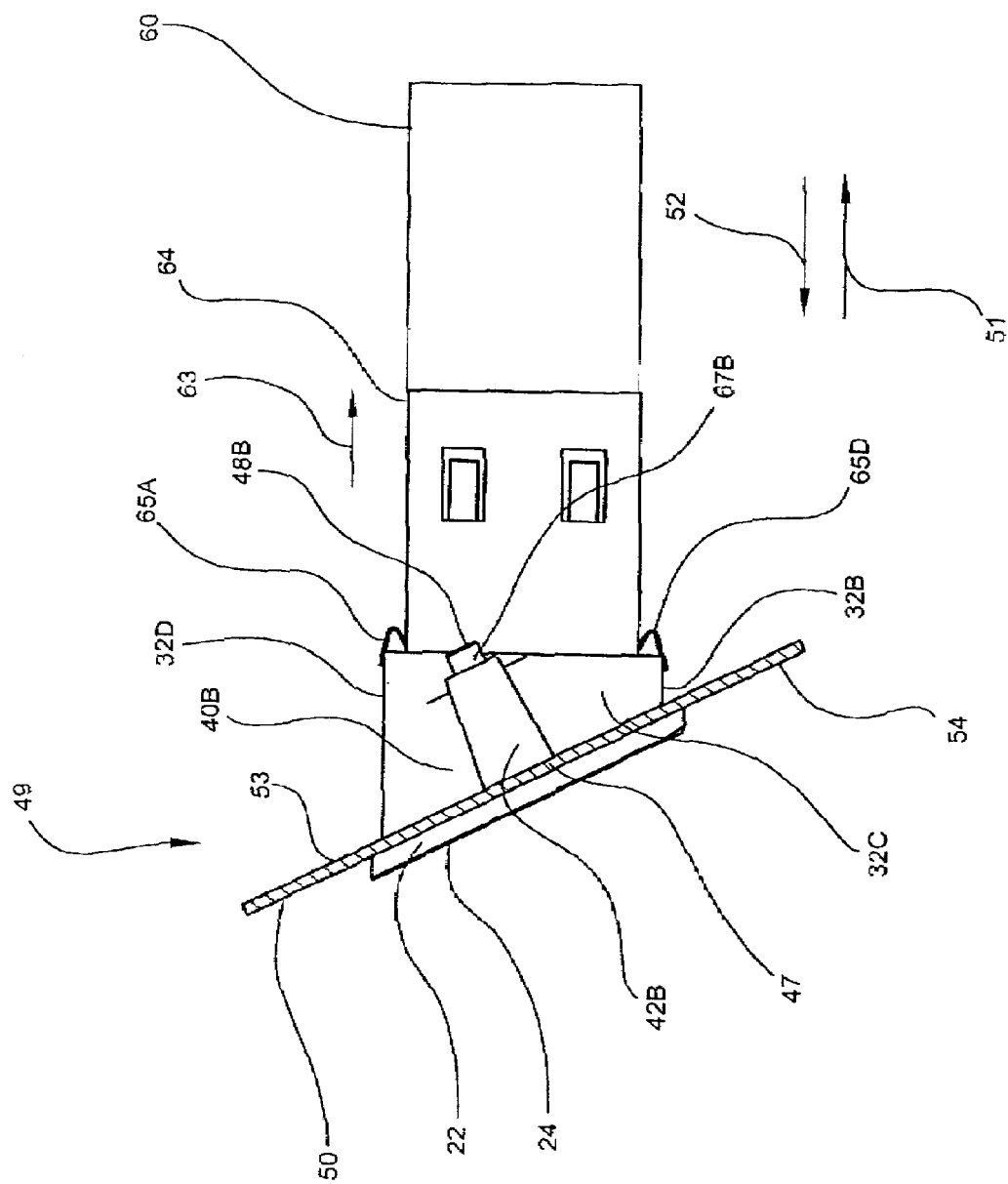
FIG. 4 shows a profile view of the installed mounting device of FIG. 2 and an audio/video accessory inserted therein.
Figure 5:
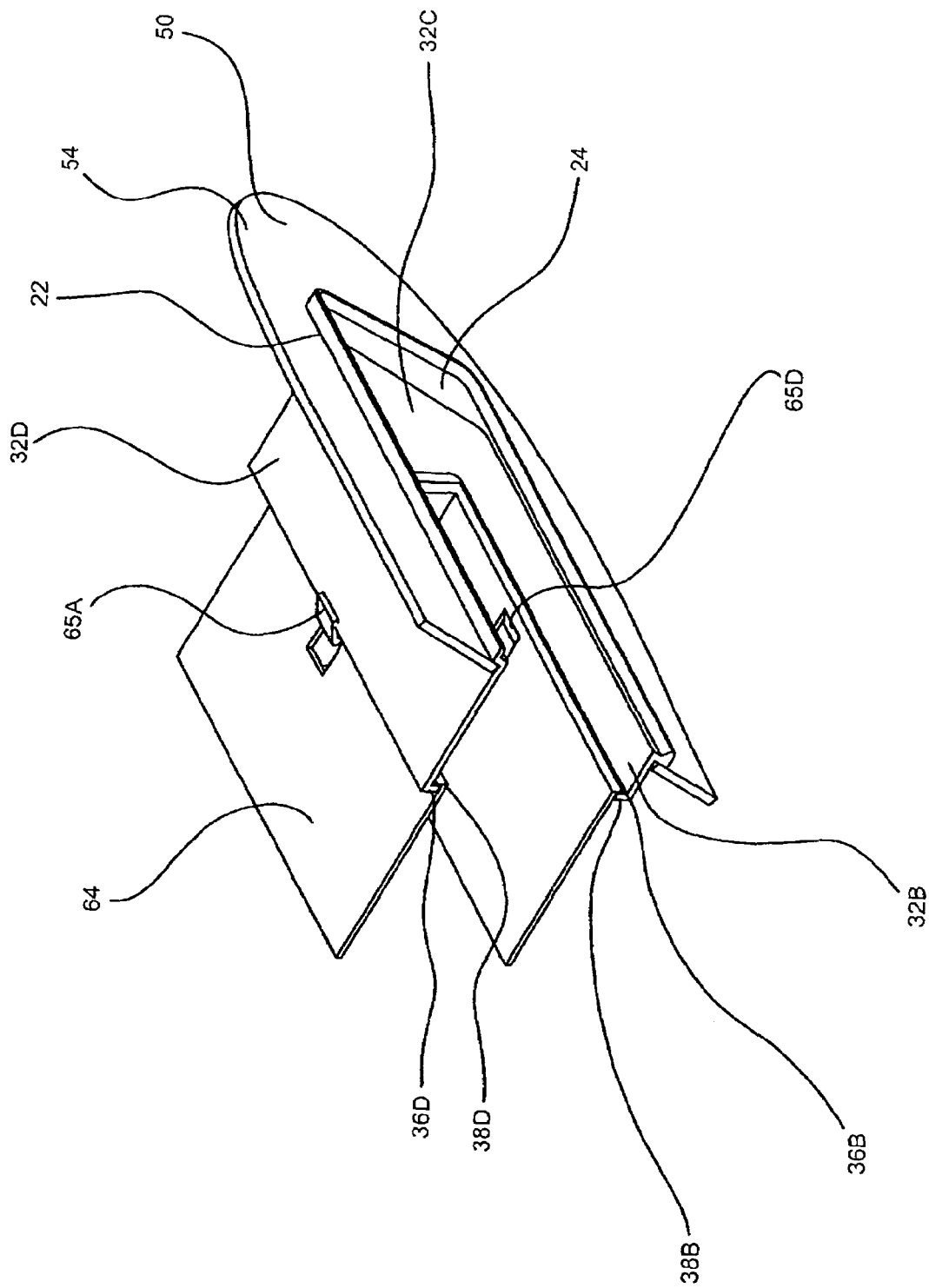
FIG. 5 shows a perspective, cut-away view of the bezel of FIG. 3 and a standard DIN radio sleeve mounted in the dashboard of a vehicle.

Bezel 21 may include a substantially planar flange 22, a plurality of walls 32A, 32B, 32C, 32D (FIG. 3) extending generally perpendicularly from flange 22, a plurality of shoulders 36A, 36B, 36C, 36D each extending in an inward direction from a respective one of walls 32, and mounting tabs 40A, 40B attached to respective walls 32A, 32B. Flange 22 has a rearward-facing surface 24 and an opposite engagement surface 26. Engagement surface 26 engages dashboard 50 along a perimeter 57 (FIG. 2) of an opening 56 in dashboard 50. Flange 22 further has an inner rim 28, defining an entrance 29 of a channel 30, sized to receive an audio/video accessory 60. Flange 22 may be sized to fit within a designated area 55 (FIG. 12) on dashboard 50 in which an original equipment flange 66 fits. That is, flange 22 may have substantially the same outer dimensions as original equipment flange 66.

Figure 8:
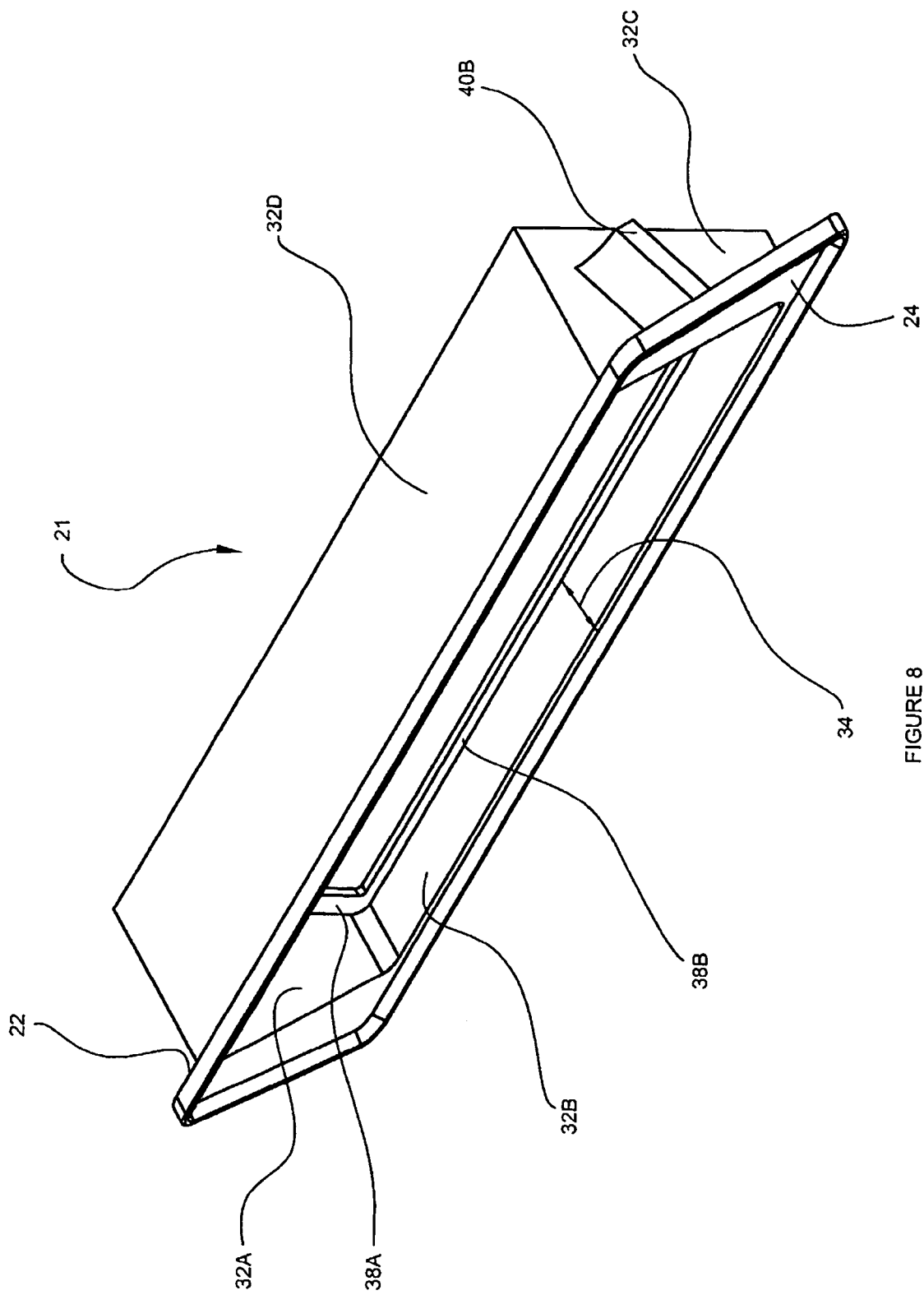
FIG. 8 shows a perspective view of the bezel of FIG. 3.
Figure 15:
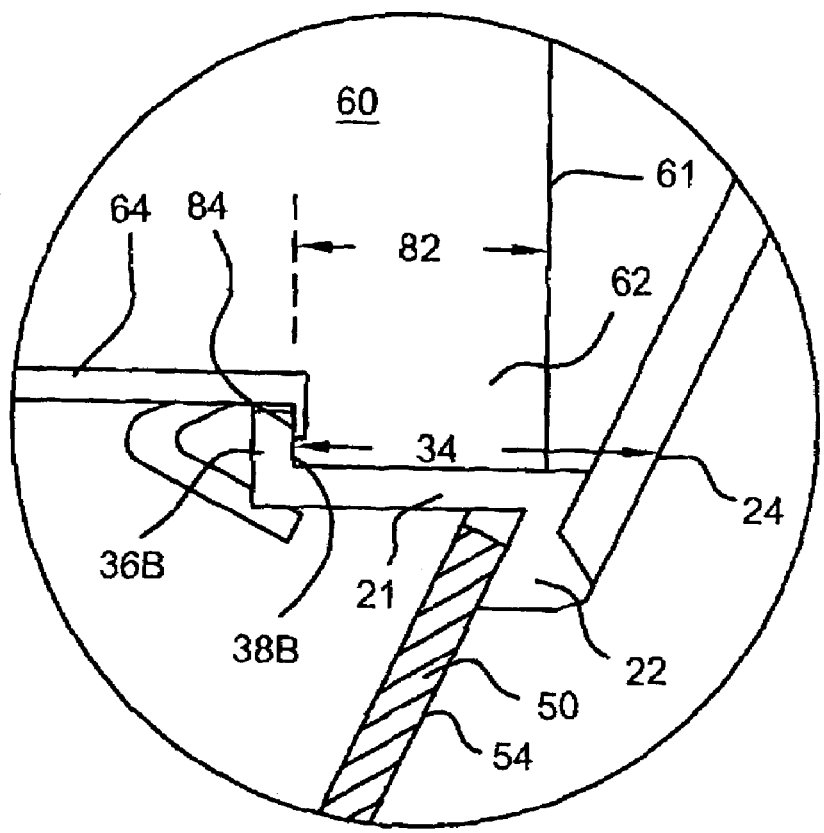
FIG. 15 shows an enlarged view of area 15 in FIG. 1.

Shoulders 36A, 36B, 36C, and 36D have respective abutment surfaces 38A, 38B, 38C, and 38D which may face in a rearward direction 52 substantially opposite to frontward direction 51. Shoulder 36B has an abutment surface 38B that is recessed or offset by a distance 34 (FIGS. 8 and 15) of at least 0.25 inch from rearward-facing surface 24 of flange 22. Offset 34 enables audio/video accessory 60 to be mounted such that a rearward-facing surface 61 of audio/video accessory 60 is approximately flush with a rearward-facing surface 54 of dashboard 50 and/or a rearward-facing surface 24 of flange 22.

In one embodiment, the offset distance 34 is approximately 0.25 inch. However, distance 34 may vary. For example, depending upon a distance 82 (FIG. 15) between rearward-facing surface 61 and a frontward-facing surface 84 of an outer portion 62 of audio/video accessory 60, offset distance 34 may need to be adjusted such that, after installation, rearward-facing surface 61 of audio/video accessory 60 is disposed substantially forward of profile 49 of dashboard 50. In general, offset distance 34 may be any distance that enables audio/video accessory 60 to be disposed substantially forward of profile 49 of dashboard 50 upon installation. In one embodiment, distance 34 ranges approximately between 0.25 inch and 0.75 inch such that rearward-facing surface 61 of audio/video accessory 60 is aligned substantially flush with profile 49 of dashboard 50. It is possible, however, for offset distance 34 to range approximately between 0.10 inch and 2.00 inches, depending upon distance 82 of audio/video accessory 60.

Walls 32A, 32C include respective mounting tabs 40A, 40B having respective recesses 41A, 41B. Recesses 41A, 41B may be elongate and internally threaded so as to receive an externally threaded fastening device, such as a screw, for purposes discussed in detail below. Elongate recesses 41A, 41B may be oriented substantially perpendicular to flange 22.

Figure 9:
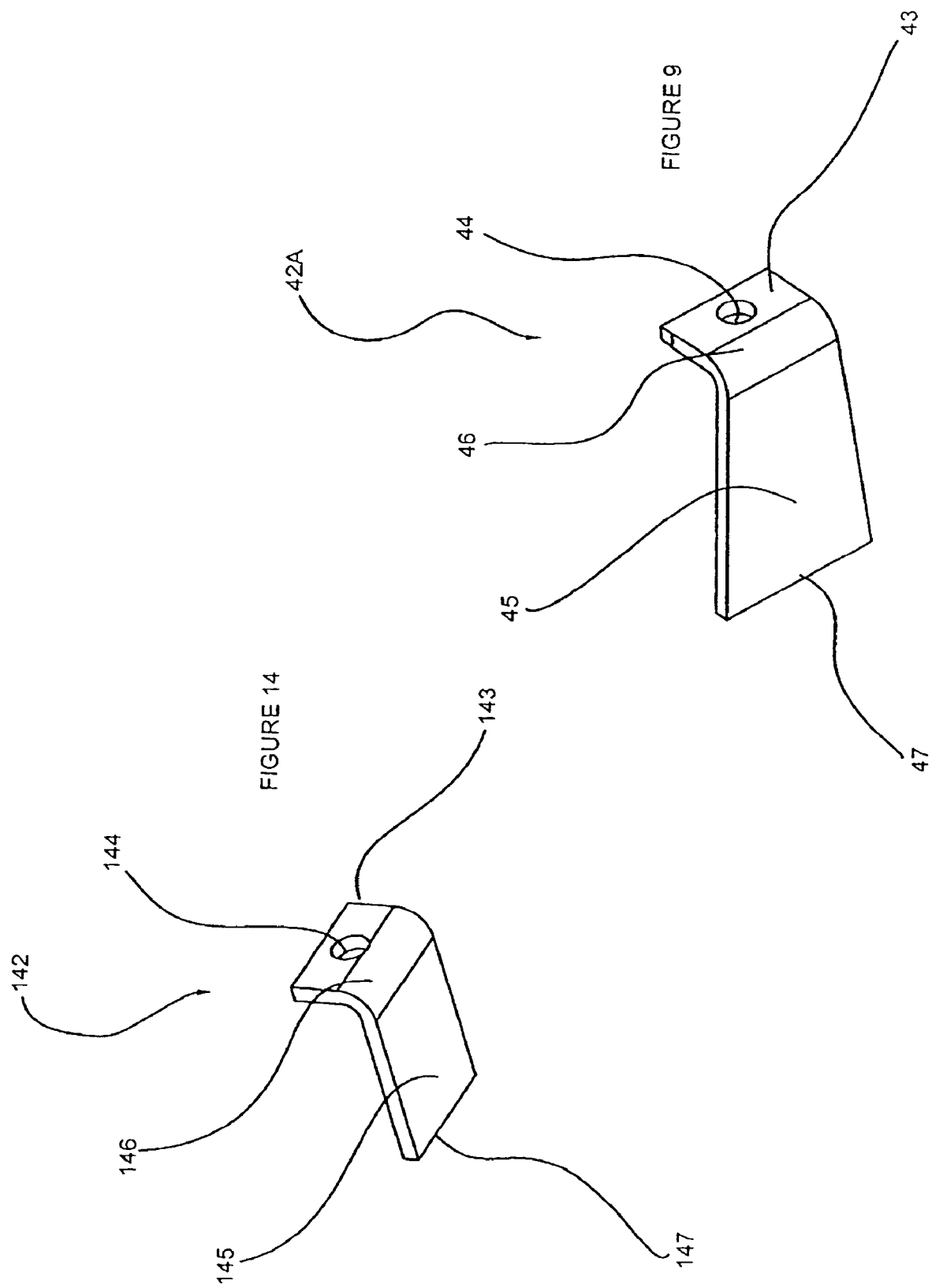
FIG. 9 shows a perspective view of a mounting bracket of the mounting device of FIG. 1.

L-shaped mounting brackets 42A, 42B may be identical, and thus only mounting bracket 42A will be described in detail with reference to FIG. 9. Mounting bracket 42A has a shorter leg 43 with a throughhole 44, and a longer leg 45 which may be oriented perpendicular to shorter leg 43. That is, a 90 degree angle may be formed between legs 43 and 45. Longer leg 45 has a proximal end 46 attached to shorter leg 43, and a distal end 47 that engages a frontward-facing surface 53 of dashboard 50. The width of longer leg 45 may increase from proximal end 46 to distal end 47 in order to engage a greater span of frontward-facing surface 53 of dashboard 50.

Each throughhole 44 may be aligned with a respective one of recesses 41 so that fastening devices 48A and 48B, such as screws, may be inserted through throughholes 44 and into a respective one of recesses 41A, 41B of mounting tabs 40A and 40B. As screws 48 are tightened and thereby moved toward dashboard 50, screwheads 67A, 67B push mounting brackets 42A, 42B toward dashboard 50 until dashboard 50 is clamped between engagement surface 26 of flange 22 and distal ends 47 of mounting brackets 42A, 42B.

Mounting device 20 may be formed of any durable material with sufficient hardness. Suitable materials include aluminum, steel, and plastic; however, any durable material with sufficient hardness may be used.

Figure 11:
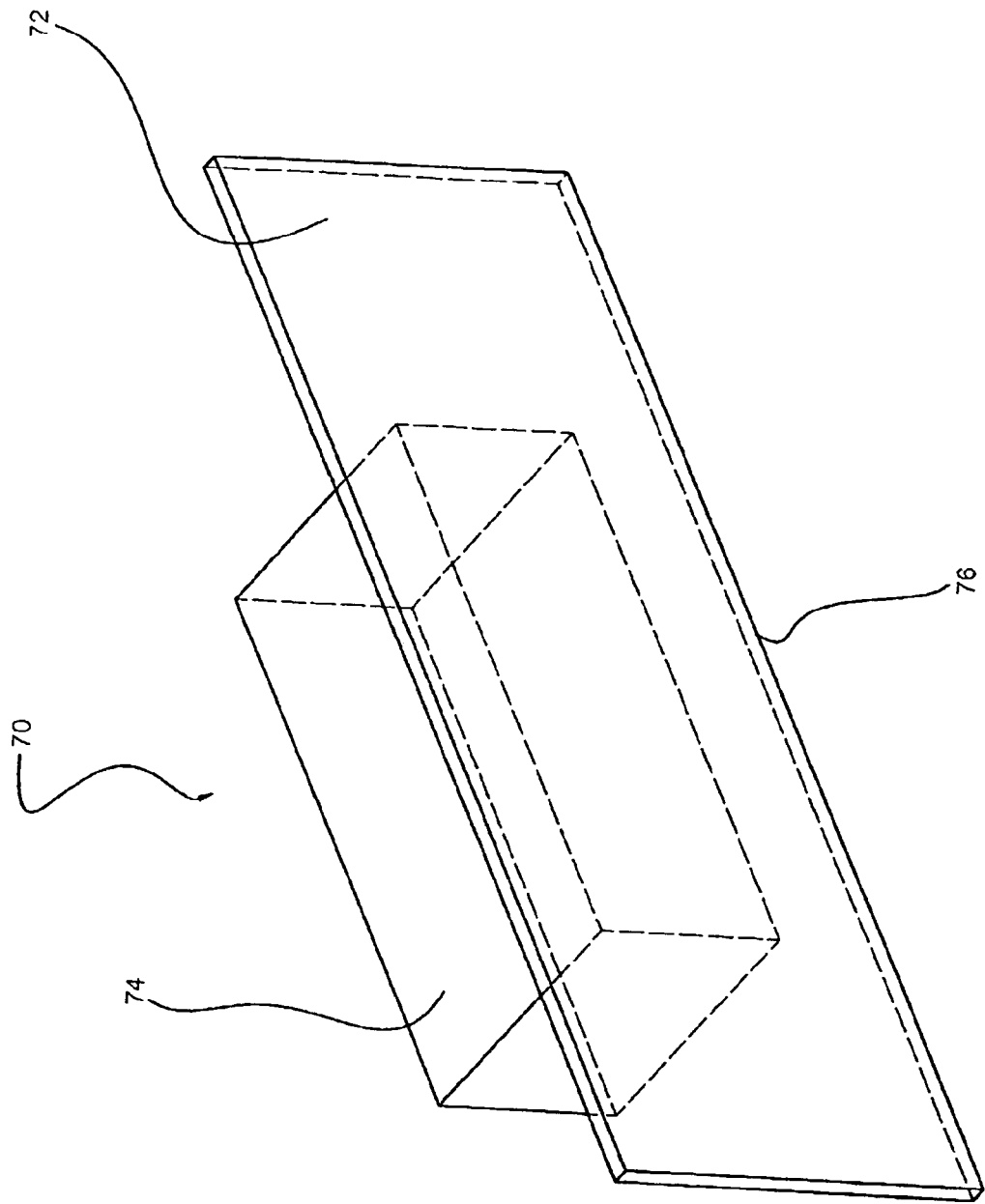
FIG. 11 shows a perspective view of one embodiment of a template of a mounting kit of the present invention.
Figure 12:
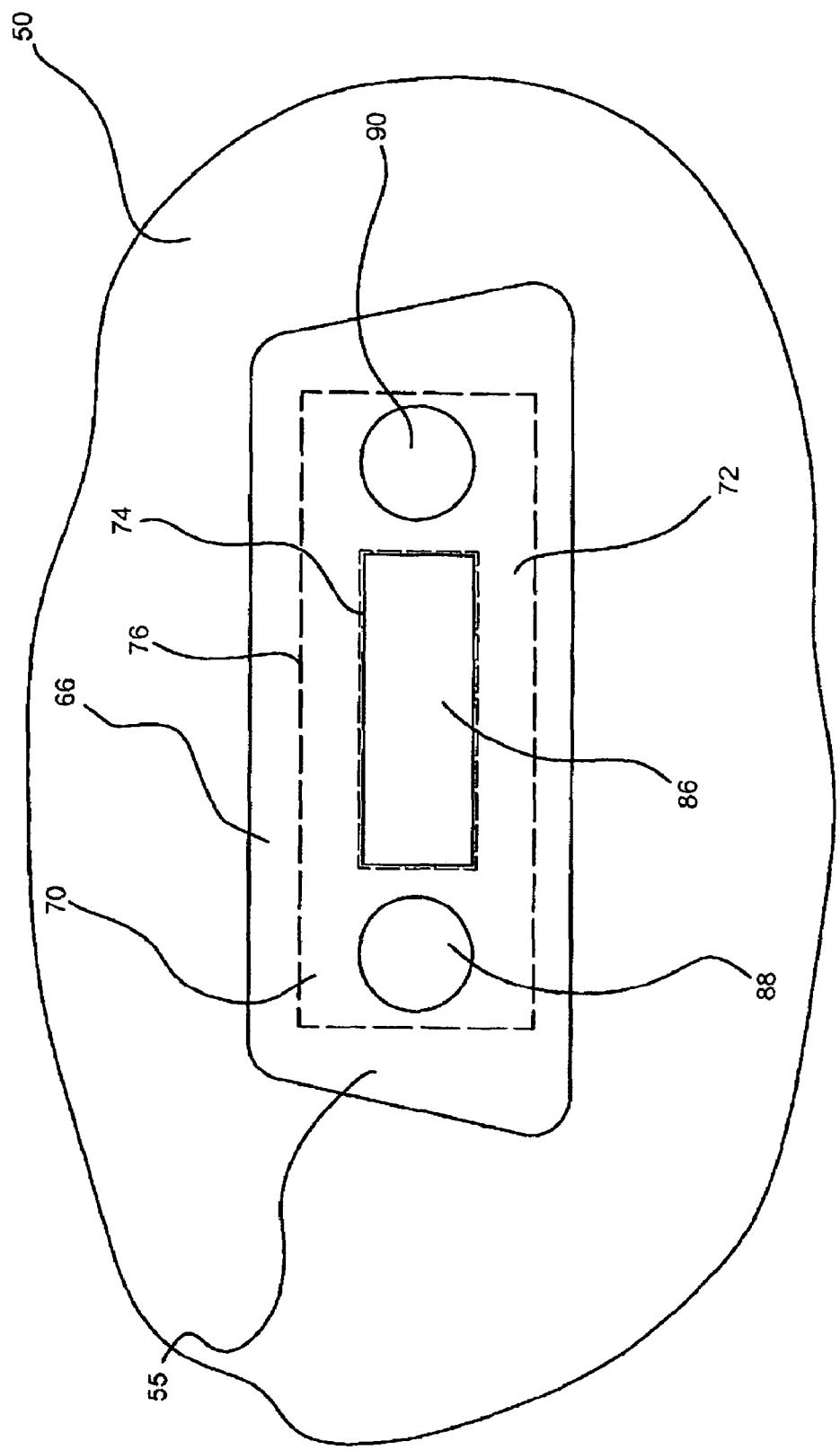
FIG. 12 shows a frontward view of an original equipment bezel, an area of the dashboard covered by an original equipment bezel, the existing holes in the dashboard, and the outline of the template of FIG. 11.

FIGS. 11 and 12 illustrate a template 70 which along with mounting device 20 forms a mounting kit for aiding in the installation of an audio/video accessory 60 in a vehicle dashboard 50. That is, a mounting kit of the present invention includes mounting device 20 and template 70. As shown in FIG. 11, template 70 includes a planar cutting guide 72 attached to a body 74. Cutting guide 72 has an outer perimeter 76 that forms an edge sized to define an opening 56 (FIG. 2) to be cut in dashboard 50 for receiving bezel 21. That is, outer perimeter 76 defines the size of the opening 56 to be cut in dashboard 50. Further, outer perimeter 76 may be sized to match the dimensions of the outer surfaces of walls 32 of bezel 21.

Body 74 may be sized to snugly fit in an existing rectangular opening 86 in dashboard 50. Existing opening 86 may have been provided when the vehicle was first manufactured in order to allow access to the pushbuttons and tuning display of an original equipment radio. Openings 86 were formed of a standard size in older model cars, as is well known. Circular openings 88, 90 may also have been provided when the vehicle was first manufactured in order to allow access to a tuning dial and a volume dial of an original equipment radio.

During use, body 74 of template 70 is inserted into existing opening 86 until cutting guide 72 engages, i.e., is situated flush against, rearward-facing surface 54 of dashboard 50. A cutting tool, such as a small rotary power saw or reciprocating saw (not shown), for example, may be used to cut dashboard 50 along perimeter 76. A tool for cutting dashboard 50 may be included in the mounting kit. The size of the opening 56 to be cut may thus be delineated by outer perimeter 76 of cutting guide 72. By cutting an opening 56 matching the size of outer perimeter 76 of cutting guide 72, bezel 21 may be snugly inserted into dashboard 50. Template 70 may be formed from any material of sufficient durability and hardness.

Figure 6:
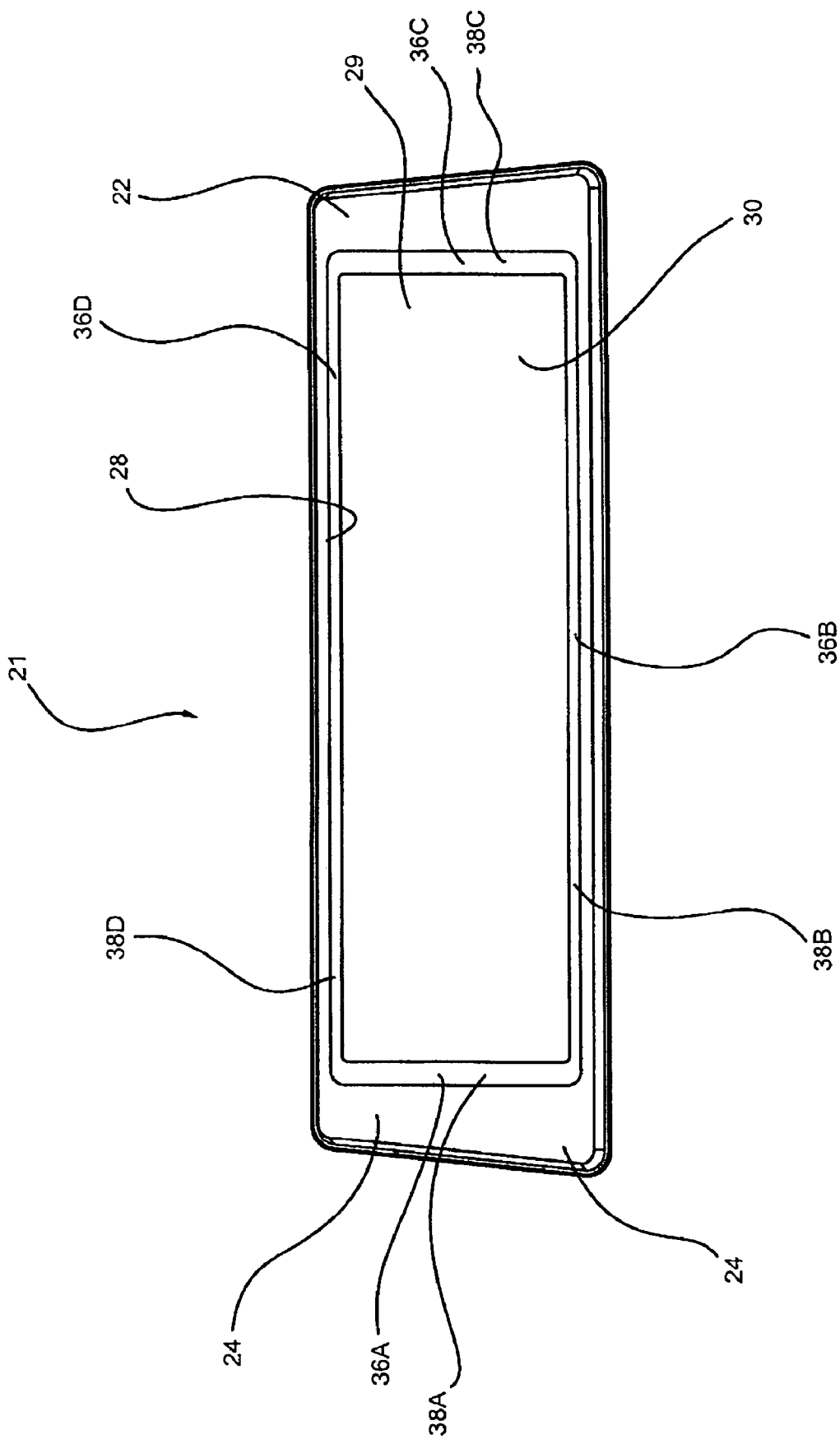
FIG. 6 shows a frontward view of the bezel of FIG. 3.

Before bezel 21 is inserted into opening 56, a standard DIN radio sleeve 64 may be inserted into bezel 21 through channel 30 (FIG. 6). Sleeve 64 may lock into position once it has been inserted sufficiently far in frontward direction 51. That is, sleeve 64 may be self-coupling to bezel 21. Sleeve tabs 65 may then be bent as shown to further secure sleeve 64 to bezel 21. Bezel 21 may then be inserted into opening 56 until engagement surface 26 of flange 22 contacts rearward-facing surface 54 of dashboard 50. Flange 22 may fit within a designated area 55 of dashboard 50 in which original equipment flange 66 used to fit.

Screws 48A and 48B may be inserted through throughholes 44 of mounting brackets 42A and 42B. Mounting brackets 42A and 42B may then be placed in association with mounting tabs 40A and 40B such that screws 48A and 48B are aligned with recesses 41, and distal ends 47 of mounting brackets 42A and 42A are positioned against frontward-facing surface 53 of dashboard 50. Screws 48A and 48B may then be tightened sufficiently to clamp dashboard 50 between distal ends 47 and engagement surface 26 of flange 22. Audio/video accessory 60 may then be inserted into channel 30 of bezel 21 until outer portion 62 of audio/video accessory 60 engages abutment surfaces 38A, 38B, 38C, and 38D of respective shoulders 36A, 36B, 36C, and 36D. Thus, further movement of audio/video accessory 60 in frontward direction 51 is prevented.

Figure 10:
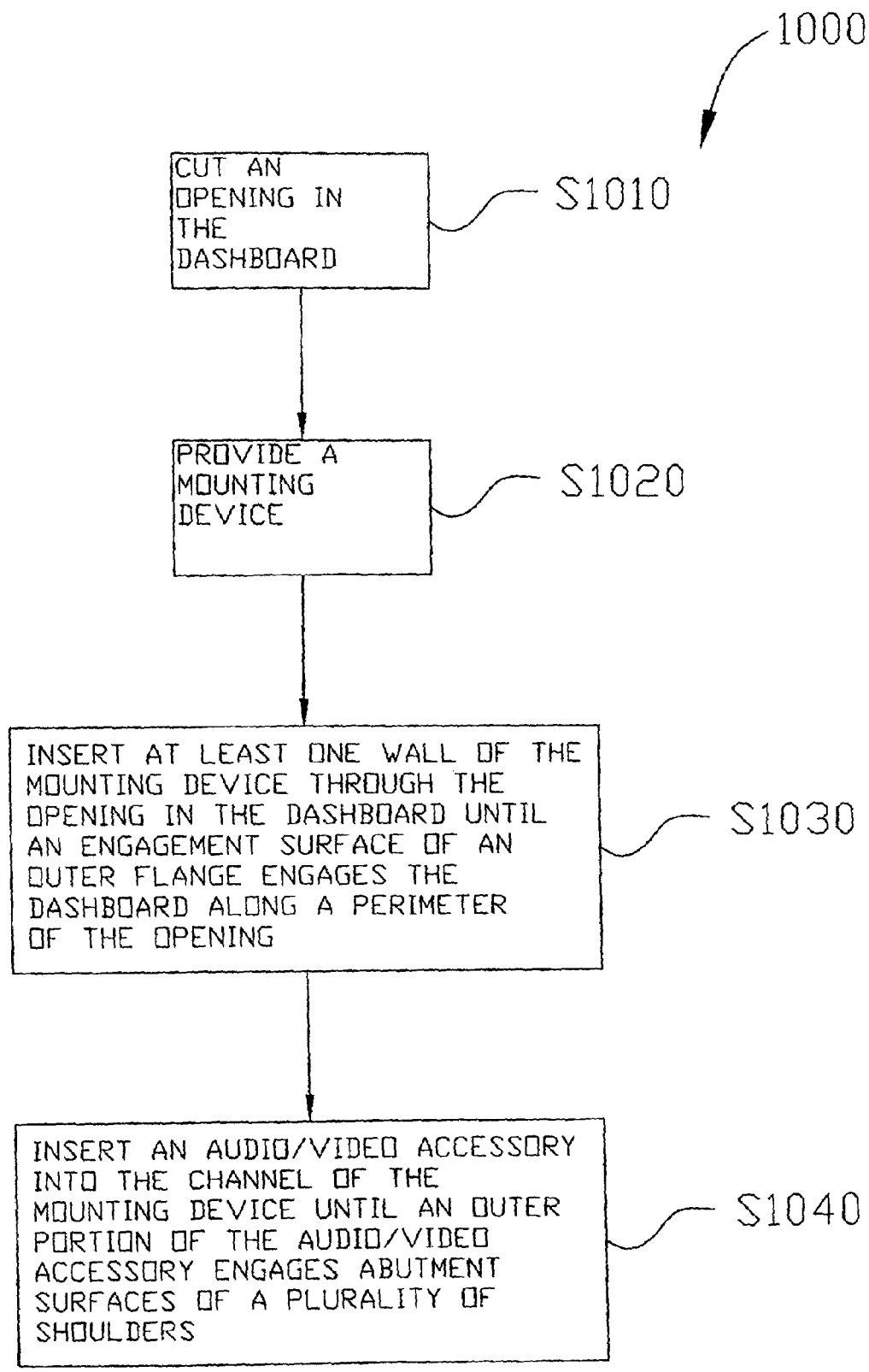
FIG. 10 is a flow chart of the steps involved in one embodiment of a mounting method of the present invention.

Illustrated in FIG. 10 is one embodiment of a mounting method 1000 of the present invention for securing an audio/video accessory in a dashboard of a vehicle. In a first step S1010, an opening is cut in the dashboard. For example, an opening 56 may be cut in dashboard 50 by use of a cutting tool and template 70. As shown in FIG. 12, template 70 may be inserted into existing opening 86 in order to define the size of the opening 56 to be cut in dashboard 50. In a next step S1020, a mounting device is provided. More particularly, a mounting device 20 may be provided, including: a flange 22 having a rearward-facing surface 24, an opposite engagement surface 26, and an inner rim 28 defining an entrance 29 of a channel 30; at least one wall 32 extending from engagement surface 26 of flange 22; and a plurality of shoulders 36 extending in an inward direction from at least one wall 32, shoulders 36 having respective abutment surfaces 38 facing engagement surface 26 of flange 22, the abutment surfaces 38 being offset from rearward-facing surface 24 of flange 22 by a distance 34 of at least 0.25 inch in a frontward direction 51.

In step S1030, at least one wall of the mounting device is inserted through the opening in the dashboard until an engagement surface of an outer flange engages the dashboard along a perimeter of the opening. For example, at least one wall 32 of mounting device 20 may be inserted through opening 56 in dashboard 50 until engagement surface 26 of flange 22 engages dashboard 50 along perimeter 57 of opening 56. Next, in step S1040, an audio/video accessory is inserted into the channel of the mounting device until an outer portion of the audio/video accessory engages abutment surfaces of a plurality of shoulders. That is, audio/video accessory 60 may be inserted into channel 30 of mounting device 20 until outer portion 62 of audio/video accessory 60 engages abutment surfaces 38 of shoulders 36. Audio/video accessory 60 may be equipped with standard DIN radio sleeve 64. Sleeve 64 may be inserted into bezel 21 prior to inserting audio/video accessory 60 into bezel 21.

Figure 13:
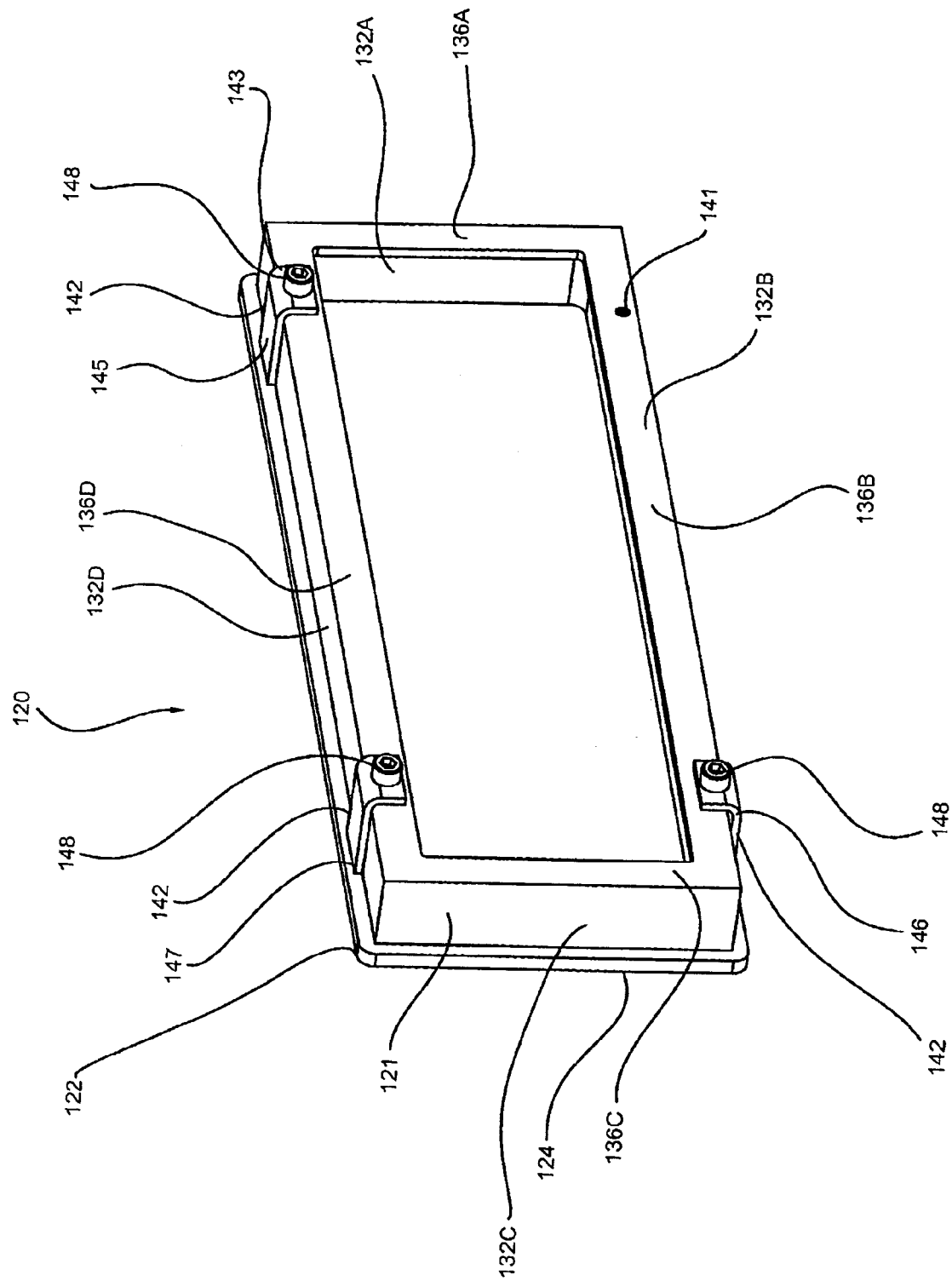
FIG. 13 shows a rearward perspective view of another embodiment of a mounting device of the present invention.

Another embodiment of a mounting device 120 of the present invention is shown in FIG. 13. Mounting device 120 may include a bezel 121, mounting brackets 142, and fastening devices 148. Bezel 121 may include a flange 122, walls 132A, 132B, 132C, 132D, and shoulders 136A, 136B, 136C, 136D. Each mounting bracket 142 may include a shorter leg 143 attached to a proximal end 146 of a longer leg 145 having a distal end 147. Only three of the four mounting brackets 142 and fastening devices 148 are shown in FIG. 13 so that a recess 141 of wall 132B for receiving a fourth fastening device 148 is visible.

Figure 16:
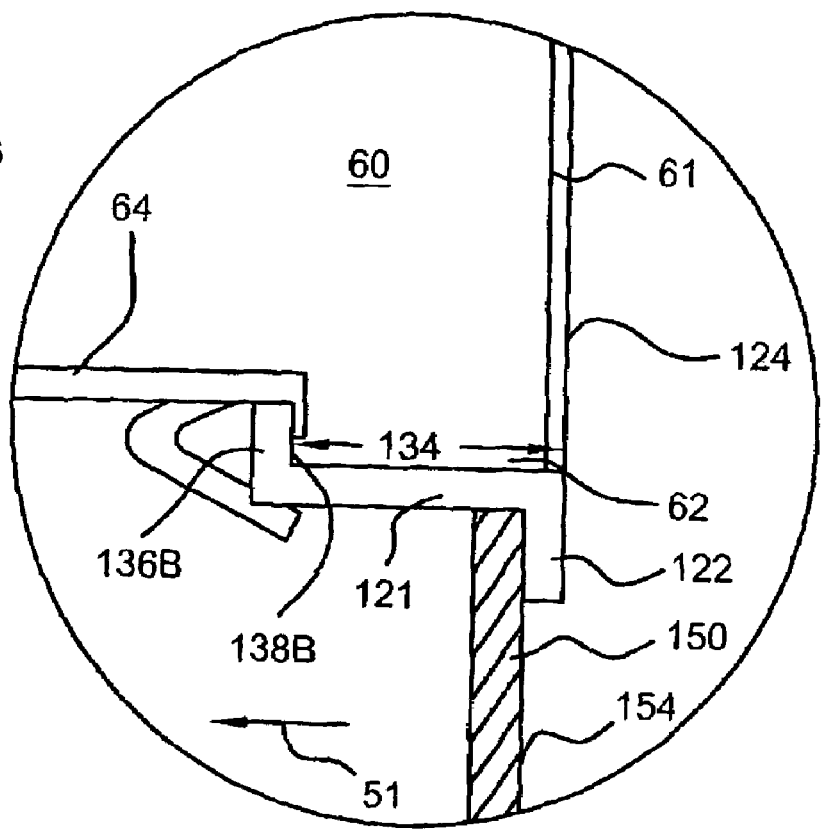
FIG. 16 shows an enlarged, cross-sectional view, similar to FIG. 15, of the mounting device of FIG. 13 inserted in an opening of a vehicle dashboard. A contemporary audio/video accessory is inserted in the mounting device.

Mounting device 120 is suitable for use with a dashboard 150 that is substantially vertically oriented, as indicated in FIG. 16. That is, the upper and lower ends of dashboard 150 may have substantially the same position in frontward direction 51.

Similarly to bezel 21, flange 122 of bezel 121 engages a rearward facing surface 154 of dashboard 150. Also similarly to bezel 21, a distance 134 between an abutment surface 138B of wall 136B and a rearward-facing surface 124 of flange 122 may be approximately between 0.25 inch and 0.75 inch such that a rearward-facing surface 61 of audio/video accessory 60 is disposed substantially forward of surface 124 when accessory 60 is installed in mounting device 120. In bezel 121, all abutment surfaces 138 of walls 136A, 136B, 136C, 136D may be offset a substantially equal distance 134 from surface 124 in frontward direction 51.

Other aspects of mounting device 120 are substantially similar to those of mounting device 20, and thus are not discussed in detail herein.

While this invention has been described as having an exemplary design, the present invention may be further modified within the spirit and scope of this disclosure. This application is therefore intended to cover any variations, uses, or adaptations of the invention using its general principles.

What is claimed is:

1. A method for mounting an audio/video accessory into an opening in a dashboard of a vehicle, the vehicle defining a frontward direction and an opposite rearward direction, said method comprising the steps of:
    providing a flange having a rearward-facing surface, an opposite engagement surface, and an inner rim defining an entrance of a channel;
    engaging the dashboard with said engagement surface along a perimeter of the opening;
    providing at least one wall extending from said engagement surface of said flange and sized to be received in the dashboard opening;
    providing a plurality of shoulders extending in an inward direction from said at least one wall, said shoulders having respective abutment surfaces facing said engagement surface of said flange, said abutment surfaces being offset from said rearward-facing surface of said flange by a distance of at least 0.25 inch in the frontward direction;
    inserting the audio/video accessory into said channel through said entrance; and
    engaging an outer portion of the audio/video accessory with said abutment surfaces during said inserting step to thereby prevent further movement of the audio/video accessory in the frontward direction through said channel.

2. The method of claim 1, wherein said at least one wall includes a recess, said mounting device further including a mounting bracket, said method comprising the further step of clamping said mounting bracket against a forward-facing surface of the dashboard by using a fastening device received in said recess.

3. The method according to claim 1, comprising the further step of providing said abutment surfaces with an offset from said rearward-facing surface of said flange wherein the offset is sized to enable the audio/video accessory to be mounted such that a rearward-facing surface of the audio/video accessory is disposed substantially forward of a profile of the dashboard.

4. The method of claim 2, wherein said clamping step includes clamping the dashboard between said mounting bracket and said flange.

\* \* \* \* \*